July 30, 1963  D. ALBERT  3,099,497
PNEUMATIC CONVEYOR FOR PULVERANT MATERIALS
Filed May 6, 1959

INVENTOR.
Douglas Albert

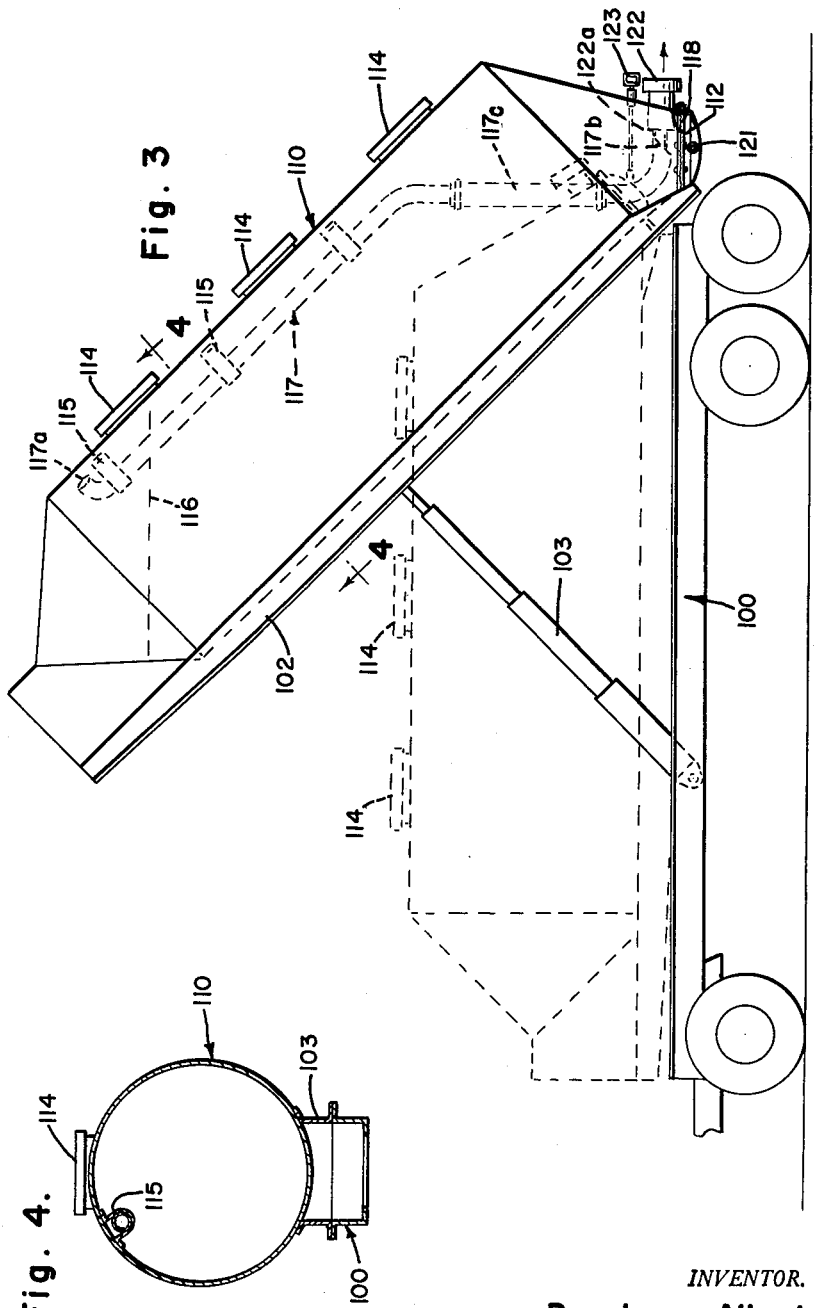

United States Patent Office 3,099,497
Patented July 30, 1963

3,099,497
PNEUMATIC CONVEYOR FOR PULVERANT
MATERIALS
Douglas Albert, Oakland, Calif., assignor to Albert Air
Conveyor Corp., Oakland, Calif.
Filed May 6, 1959, Ser. No. 811,412
10 Claims. (Cl. 302—52)

This invention relates to the art of pneumatic conveying equipment, and more particularly, relates to a method of and means for conveying fluidized bulk material (such as a dry pulverant material, as for example, sugar, cement, powdered chemicals) from a pressure vessel through a conveyor line leading externally of said vessel.

In the embodiment of the invention which is illustrated in the drawings and which will be described in more detail hereinafter, there is disclosed a pressure vessel for containing bulk material to be conveyed. The pressure vessel includes an air pervious bottom closure, adapted for connection to an air pressure source, and through which air can be introduced through the bottom of the vessel to fluidize the bulk material. A conveyor conduit leading from said vessel is disposed with its inlet opening within the vessel above, but and adjacent to, the air pervious bottom closure. An air feed back preferably wholly disposed within the vessel with its intake end adjacent the top of the vessel and in communication with the air pressure head therein and with its discharge side adjacent and in substantial axial air flow registry with the inlet opening of the conveyor pipe, is also provided. In the embodiment shown in the drawings I provide means for adjustably moving the discharge side of the air feed-back pipe relatively toward and away from the inlet opening of the conveyor conduit so as to adjustably enlarge and narrow the space between the feed-back pipe and inlet opening to permit the rate of feed of bulk material into the inlet opening to be metered or controlled. Further, and as will appear, the invention is such that the discharge side of the feed-back pipe may be telescoped within the inlet opening of the conveyor pipe to completely shut off flow of fluidized material into the conveyor pipe, yet, without restricting the axial flow of air from the feed-back pipe into the conveyor pipe.

Heretofore various systems have been proposed for conveying bulk materials, usually dry pulverant materials, such as flour, sugar, cement, chemicals, and the like, by pneumatic conveyors that operate on the principle of first aerating the material to fluidize it and to cause it to behave in many respects like a liquid. It has been found that by fluidizing the pulverant materials it is possible to pneumatically convey them through pipes at air pressures of from perhaps 5 to 40 lbs. p.s.i. and at relatively low velocities (usually under 22 ft. per second). Among the economic advantages of pneumatic conveying of the type herein referred to is that it provides a relatively high ratio between quantity of material conveyed/per volume of air used.

A principal object of the present invention is to provide a novel system by which it is possible to adjustably vary and control the rate of bulk feed from the pressure vessel into the conveyor line in the most efficient ratio to a substantially constant air supply and without varying said air supply to or through the conveyor line. In this connection, I am aware of systems in which it has been proposed to regulate the flow of feed through a conveyor line by valving or throttling both the amount of air as well as the amount of bulk material from the pressure vessel into the conveyor line. Such arrangement is generally unsatisfactory because it fails to take into account the fact that one primary reason for wanting to vary the amount of air to bulk feed in any conveyor line is when the line becomes clogged due to an excess of material, whereupon it is extremely advantageous to cut down on the amount of bulk material without decreasing the rate of air flow through the line so as to unclog it.

Another object of the present invention is to provide a pneumatic system of the character briefly referred to hereinabove and in which the inlet opening from the pressure vessel into the conveyor line, in conjunction with the means for adjustably regulating the rate of bulk feed into the line without restricting the air flow to the line, are all located within the fluidized zone of the pressure vessel. In this regard, I am aware of prior art systems by which the fluidized bulk material in the pressure vessel is discharged from the fluidization zone of the pressure vessel into a distributing manifold where in theory, at least, it is metered into a pneumatic conveying line. My knowledge of these types of systems indicates that it is highly undesirable to try and meter fluidized material from any location externally of the fluidization zone in the tank because with materials, such as cement, sugar, flour, chemicals, etc., the material loses its fluidized characteristics within a span of seconds after it leaves the fluidized zone of the pressure vessel. Accordingly, any momentary shut-down or slow-up in the conveyor line causes the material to pack and this, in turn, may lead to "slugging" or even clogging, temporary or permanent, of the line. Accordingly, and as above indicated, an advantage of the present system is that all of the metering of the bulk feed material into the conveyor line occurs in my system in the fluidization zone within the pressure vessel.

Another object of the invention is to provide a mobile vehicle mounted unit which includes a pressure vessel that can be tilted or raised from a substantially horizontal position during loading and transportation to a vertically tilted position during unloading operations. By providing a tiltable or elevatable pressure vessel of the latter mentioned type, it is possible to construct pneumatic conveyor units on highway vehicles of substantially larger capacity than would be possible or feasible employing only fixed vertical pressure vessel type installations. In this connection it is possible to make the height of the vessel greater than permissible vertical clearance heights of road vehicles as prescribed by various State laws by virtue of the fact that the pressure vessel can be tilted or lowered to a substantially horizontal position on the vehicle body at all times except when the vehicle is parked and the unit is put into operation at its unloading destination.

A further object is to be able to maintain air pressure in the vessel within a desired range of pressures, and below a predetermined maximum pressure, by controlling the rate of feed from the vessel.

Other objects and advantages of the invention will become apparent upon reading the following specification and referring to the accompanying drawings in which similar characters of reference represent corresponding parts in each of the several views.

In the drawings:

FIG. 3 is a view in side elevation, with certain portions shown diagrammatically of a conveyor unit embodying the invention and mounted for tiltable or elevatable movement on a dump truck body; and FIG. 4 is a sectional view taken substantially on line 4—4 of FIG. 3.

Figure 1:
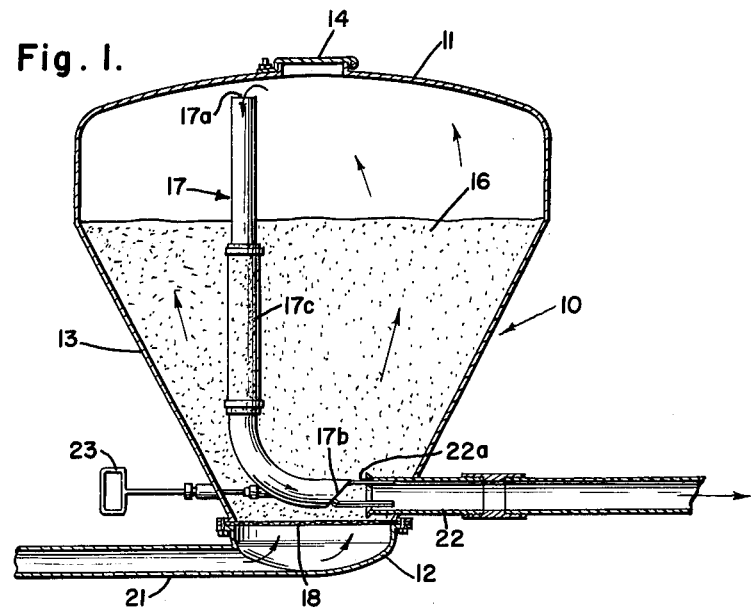
FIG. 1 is a vertical sectional view of a pneumatic conveyor unit embodying the invention.
Figure 2:
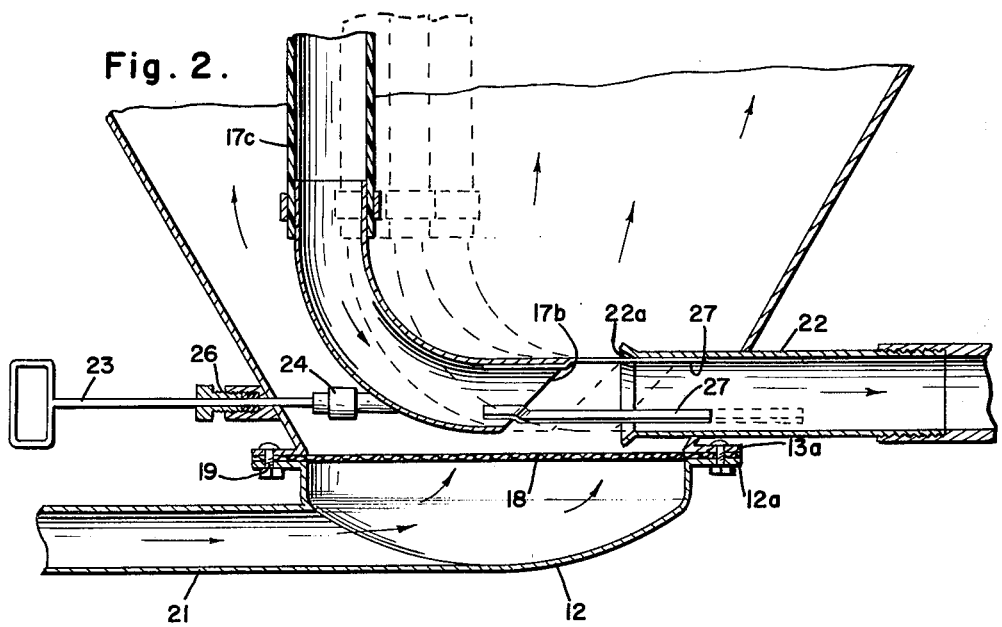
FIG. 2 is an enlarged fragmentary view of the structure shown in FIG. 1.

Referring now more specifically to FIGS. 1 and 2, a funnel-shaped pressure vessel as indicated generally and at 10, which includes an upper dome segment 11 of substantially larger diameter than the base or bottom segment 12, the dome and the base being connected by downwardly and inwardly diverging side walls 13. The dome 11 is provided with a door or hatch closure 14 through which it is possible to fill the pressure vessel 10 with bulk material, such as indicated generally at 16. The filling of the pressure vessel through the hatch 14 may be accomplished in any conventional manner, such as by hopper or other conveyor unit (not shown) located above the pressure vessel. As will later be described, the vessel 10 is not filled completely to its top, but rather would be filled to a level by which, even in its fluidized state is always below intake end 17a of air feed-back pipe which is indicated generally by the reference character 17. The structure and operation of feed-back pipe 17 will be described in more detail hereinafter.

The bottom segment 12 of the pressure vessel comprises an air inlet manifold or housing formed with a marginal flange 12a complementary to a marginal flange 13a of the pressure vessel body. The cooperating flanges 12a—13a clamp between them an air pervious diaphragm 18 that defines in effect the bottom closure for the pressure vessel 10 and on which is supported the bulk material 16 within the vessel. More specifically, the air pervious closure 18 may be formed of multi-ply canvas or fabric of a type well known in the art, or if desired, the member 18 may be made of porous ceramic or other solid material that will insure uniform passage and distribution of air through its interstices and which has sufficient structural strength to support the bulk load 16 of material. The member 18 is held in clamped relation between the cooperating flanges 12a—13a by suitable bolts 19.

An air supply conduit 21 adapted for connection to a source of air under pressure, such as a conventional Root type blower (not shown), communicates to the interior of manifold housing 12, and air flowing through the interstices of the pervious closure 18 will aerate and fluidize the bulk material 16 within the pressure vessel 10. Aeration of the material will cause the same to expand volumetrically to perhaps one and one-third (1⅓) times its original volume, and consequently, the reason for filling the container in the first instance to a point substantially less than its maximum height to allow for volumetric expansion of the material upon aeration.

The reference character 22 designates the conveyor line or conduit leading outwardly from the pressure vessel and having its flared inlet opening 22a located above, but rather closely adjacent the perforate closure 18. The lower discharge end 17b of feed-back pipe 17 is mounted in axial air flow registry with inlet opening 22 and is also mounted for movement relatively toward and away from said inlet opening 22. More specifically, in the embodiment shown in FIGS. 1 and 2, the feed-back pipe 17 includes a flexible hose mid-section 17c which permits the lower elbow end of the pipe, including discharge end 17b, to be swung relatively toward and away from said conveyor pipe inlet opening 22a. FIG. 2 illustrates by solid lines and dotted lines three different positions of the discharge end 17b of the feed-back pipe relative to the inlet opening 22a of the conveyor conduit. In solid lines, the lower end of the feed pipe is shown spaced substantially removed (but in axial air flow registry with) the inlet opening, whereas, the dotted lines show how the feed pipe may be moved closer to the inlet opening and finally into fully telescoped relation inside of the conveyor conduit. In view of the fact that the lower end of the feed pipe swings through a relatively long radius of arc, the adjustable reciprocable movement of the lower end of the pipe relatively toward and away from the conveyor conduit may be considered for all practical purposes as along an axial path rather than an arcuate path of movement.

The lower end of the feed pipe may be adjustably spaced with reference to the conveyor pipe inlet opening 22a by manipulation of control rod or shaft 23 which is coupled by a flexible connection 24 to the lower end of the feed-back pipe and which extends outwardly through a packing gland or seal 26. As will be apparent, axial reciprocation of the control rod 23 will cause corresponding movement of the feed-back pipe relatively toward and away from the conveyor conduit. So as to at all times maintain the discharge end 17b of the feed-back pipe in air flow registry with the conveyor conduit, I provide a plurality of elongate guide elements, such as indicated at 27. Each of the guide elements may be secured as by spot welding or the like to the interior walls of the feed-back pipe so as to project therefrom into slidable engagement against the walls defining the bore of the conveyor conduit. The guide elements may be relatively thin and can be made so as not to unduly obstruct or constrict passage of bulk material through the conveyor conduit.

The discharge end 17b of the feed-back pipe is chamfered or bevelled downwardly and rearwardly whereby when the feed-back pipe is moved toward inlet opening 22a of the conveyor conduit, the upper edge of the feed back pipe will contact said inlet opening 22a first while the lower portion of the bevelled end 17b will remain rearwardly spaced from said opening. The purpose of bevelling the feed-back pipe will now be explained with reference to the overall operation of the unit.

Assuming that the pressure vessel 10 has been loaded through the door or hatch opening 14 to the proper level and the hatch closure 14 then closed so as to render the vessel air tight, air under pressure of perhaps 5 to 15 lbs. p.s.i. is introduced through the air supply pipe 21 housing 12 and is uniformly distributed through the interstices of perforate bottom closure 18. As the air enters the vessel, it must travel upwardly through the bulk material 16 which aerates and fluidizes the latter. As previously indicated, sufficient unoccupied headspace must be left adjacent the top of the pressure vessel to permit the bulk material to volumetrically expand as it becomes aerated and fluidizes. I have observed that most pulverant material susceptible to fluidization and conveyance by systems of the character herein referred to will volumetrically expand approximately one and one-third times their normal compacted bulk volume. Therefore it is important to leave at least this much unoccupied headspace in the vessel when the latter is initially loaded with the bulk material.

It is also desirable to gauge the amount of load in the pressure vessel so that even after it is aerated and volumetrically expands, its maximum level will still be at least slightly below the intake end 17a of the feed-back pipe 17, whereby only air will enter the feed-back pipe. As the bulk material in the vessel becomes aerated and as the air pressure commences to build up in the vessel, the bulk material in the zone adjacent the inlet opening 22a of the conveyor pipe will be caused to flow through the pipe in accordance with the usual and expected behavior of fluidized material of the type under discussion. The rate of flow of material into the conveyor pipe can be regulated by adjustable spacing of the discharge end of the feed-back pipe 17b which, as above mentioned, can be accomplished through manipulation of the control rod 23. More specifically, it will be evident that the further rearward the feed pipe is moved from the inlet opening, the space between the two will be enlarged to accommodate a maximum flow of bulk material into the conveyor conduit. Conversely the flow of bulk material into the feed-back pipe into telescoped position as shown in dotted lines in FIG. 2. It is extremely important to note, however, that the rate of air flow through the feed-back pipe and into the conveyor conduit will remain substantially constant regardless of the position or relative spacing between the feed-back pipe and the inlet opening to the conveyor conduit. This permits the rate of flow of bulk material to be adjustably metered or throttled in the most efficient ratio to the substantially constant air supply and without having to vary the continuous and constant output of the latter. Further, in the event that the conduit line 22 commences to become overloaded or clogged with an over-abundance of the conveyant material, it is possible to take immediate or emergency action by telescoping the feed back pipe into the conveyor line, thereby shutting off all flow of pulverant material to the latter and supplying the conveyor line with a substantially pure air flow to alleviate the obstruction or clogging of material in the downstream part of the line.

I have found that by bevelling downwardly and rearwardly the discharge end 17b of the feed-back pipe as aforesaid that it is possible to empty the pressure vessel of bulk material to a lower level than can be accomplished using a non-bevelled or square cut feed-back pipe. More specifically, I have observed that as the tank empties below the level of the upper portion of the inlet opening 22a, it is desirable to progressively move the discharge end 17b of the feed-back line into increasingly telescoped relation within the conveyor conduit so as to always maintain the passage between the feed pipe and the inlet opening below the receding level of the bulk material. As soon as the level of the material drops below the available feed passage into the conveyor tube, the air within the vessel will take the path of least resistance and flow into the conveyor tube without conducting any substantial quantities of material with it. Thus by bevelling the feed-back pipe as indicated, it is possible to form a feed passage into the conveyor line which decreases in size and which also decreases in height to an ultimate position very closely adjacent the bottom closure 18 of the vessel.

Referring now more specifically to FIGS. 3 and 4 there is disclosed an embodiment of the present invention mounted on the bed of a dump truck vehicle, such as designated fragmentarily and diagrammatically by the numeral 100. The pressure vessel and its related pneumatic components as indicated generally at 110, the latter being supported on an elevatable or tiltable bed or frame 102 which in accordance with what may be considered conventional dump truck construction can be raised and lowered from a horizontal to perhaps a 45° angle by a hydraulic ram 103. The pressure vessel 110 defines, generally, an elongate cylindrical body in which the loading hatches 114 are disposed in longitudinally spaced relation along the top periphery of the cylinder to permit the vessel to be loaded in conventional fashion from a hopper or the like when the vessel is lowered and occupies its substantially horizontal position as shown in broken lines in FIG. 3.

The other components of the pneumatic system including a feed-back pipe, air inlet manifold, air conveyor conduit, and control rod for adjustably spacing the discharge end of the feed-back pipe relative to the inlet opening of the conveyor line, as well as the other related components comprising the pneumatic system may be considered structurally and functionally substantially identical to the various parts illustrated and described with reference to FIGS. 1 and 2. Consequently, the mechanical components comprising the pneumatic conveyor unit shown in FIGS. 3 and 4 are numbered similarly to corresponding parts illustrated and described with reference to FIGS. 1 and 2, except that in FIGS. 3 and 4 the parts are designated in the 100 series.

With specific reference to the feed-back pipe 117 shown in FIGS. 3 and 4, it is observed that this element includes an intake end 117a, which when the vessel is elevated by the ram 103 during unloading operations will be located adjacent the uppermost regions of the vessel. The feed-back pipe is mounted by brackets 115 to the interior walls of the tank out of alignment with the loading hatches 114 so as not to interfere with the loading of bulk material through the hatches into the vessel.

In operation, the vessel is normally loaded and transported in its horizontal position. At the unloading station, the ram 103 is actuated to elevate the vessel to an angle where gravity will cause the bulk material to gravitate toward the bottom end 112 thereof. Air under pressure introduced through supply line 121 is distributed uniformly through the interstices of the perforate bottom closure 118 and will aerate and fluidize the bulk material 116 in the vessel. Air in the upper regions of the tank will flow into the feed-back pipe 17 and be discharged in axial air flow alignment with the inlet opening 122a of the conveyor line conduit 122. By means of a control rod 123, the lower discharge end 117b of the feed-back pipe may be swung about the flexible hose axis 117c relatively toward and away from inlet opening 122a whereby the rate of feed of bulk material into the conveyor line can be throttled and controlled in reference to the relatively constant air supply and in reference to downstream conditions that may develop in the conveyor line. Therefore, the operation of the pneumatic conveyor unit of FIGS. 3 and 4 may be considered substantially identical to the function and operation of the stationary type unit explained with reference to FIGS. 1 and 2.

Not only is it possible to control the rate of feed in reference to the relatively constant air supply into the pressure vessel, but substantially the converse situation is also true. More specifically, and as earlier indicated, it is an object of the invention to be able to maintain the air pressure in the vessel within a desired range of pressures, and below a predetermined maximum pressure, simply by controlling the rate of feed from the vessel. Generally speaking, the air pressure in the vessel constructed in accordance with the present invention will build up and increase in proportion to the increase in rate of feed of the bulk material into the conveyor line from the vessel; and by the same token, pressure in the vessel will decrease proportionately to the decrease in rate of flow of feed into the conveyor line. Stated otherwise, the greater the load in the conveyor line, the more restricted will be the air flow therethrough and the higher the air pressure that will build up in the pressure vessel. In view of these observations, it is seen that it is possible and entirely feasible to maintain the air pressure within the vessel at a desired level and below a predetermined maximum by increasing or decreasing the proportionate rate of feed of the bulk material from the vessel into the conveyor line. This aspect of the invention is perhaps of particular importance in conveyor systems where the blowers operator at optimum efficiency within a predetermined range (within which it is always desirable to maintain operating pressures) or in systems where the pressure vessel has a definite maximum safety pressure factor exceeding which actual pressure should never be permitted. Thus, for example, where weight of the pressure vessel is a significant factor, the vessel may be a non-code type (i.e., not constructed in accordance with the American Society of Mechanical Engineering specification) in which case the maximum operating pressure would normally be fixed at 15 lbs. p.s.i. In constructing transportable pneumatic conveyors, of maximum capacity, it is contemplated that the lighter weight non-code tanks would usually be employed. Consequently, and in accordance with the present invention, it would always be possible to reciprocate the feed-back pipe to regulate the rate of flow into the conveyor line to thereby always keep the pressure in the vessel below the usual maximum 15 lbs. p.s.i., and within the most efficient operating range of the air blower or compressor source.

By way of specific example concerning practice of the invention, a test unit constructed in accordance with the principles of the invention herein set forth was operated to convey 500 lbs. per minute of Portland cement from a pressure vessel through 130 feet of 3″ conveyor conduit including four 90° bends and employing 65 c.f.m. of air at 14 lbs. p.s.i., indicating that 7.7 lbs. of pulverant per cubic foot of air was being conveyed.

Although the system herein described has been explained with specific reference to the conveyance of dry pulverant materials of the character hereinabove mentioned, it is contemplated that other types of bulk material can be conveyed efficiently by substantially the same methods and equipment as herein disclosed. For example, it is believed that wet concrete and perhaps other wet slurry types of materials may be aerated and conveyed in accordance with the teachings of the present invention with no substantial modifications or with modifications within the skill of the art.

Although the foregoing invention has been described in some detail by way of illustration and example for purposes of clarity of understanding, it is understood that certain changes and modifications may be practiced within the spirit of the invention as limited only by the scope of the appended claims.

In the claims:

1. In a pneumatic conveying system, the combination comprising a pressure vessel for containing bulk material to be conveyed; said vessel including an air pervious bottom closure adapted to be connected to an air pressure source and through which air can be introduced through the bottom of said vessel to fluidize said bulk material in said vessel; a conveyor conduit for conveying material from interiorly of said vessel and disposed with its inlet opening in said vessel above and adjacent to said pervious bottom closure; and air feed-back pipe in said pressure vessel having its intake end in communication with space within said vessel above the level of material contained therein and disposed with its discharge end adjacent and in substantial air flow registry with the inlet opening of said conveyor conduit; said feed-back pipe including a flexible hose section between said inlet and discharge ends defining a flexible joint about which said discharge end of said pipe may be swung relatively toward and away from said inlet opening; and control means connected to said discharge end and extending externally of said vessel operable to move said discharge end relative to said inlet opening to adjustably enlarge or narrow the space between the discharge end and inlet opening; the space between said discharge end and inlet opening defining a passage by which bulk material in the vessel is introduced into said inlet opening.

2. The combination of claim 1 and wherein said air pipe comprises an air feed-back pipe disposed wholly within said vessel and located with its inlet side adjacent the top closure of said vessel.

3. In a pneumatic conveying system, the combination comprising a pressure vessel for containing bulk material to be conveyed; said vessel including an air pervious bottom closure adapted to be connected to an air pressure source and through which air can be introduced through the bottom closure adapted to be connected to an air pressure source and through which air can be introduced through the bottom of said vessel to fluidize said bulk material in said vesesl; a conveyor conduit for conveying material from interiorly of said vessel and disposed with its inlet opening in said vessel above and adjacent to said pervious bottom closure; an air feed-back pipe in said pressure vessel having its intake end located adjacent the top interior of said vessel and disposed with its discharge side adjacent and in substantial air flow registry with the inlet opening of said conveyor conduit; means for reciprocating the discharge end of said pipe relatively toward and away from said inlet opening to narrow and enlarge the space between said discharge end to said inlet opening; the space between said discharge end and said inlet opening defining a passage for feeding of said fluidized bulk material into said inlet opening of said conveyor conduit; and control means extending externally of said vessel operable to permit adjustable relative movement between said discharge end and inlet opening relatively toward and away from one another.

4. The combination of claim 3 and wherein said feed-back pipe includes a flexible hose section between said intake and discharge ends defining a flexible joint about which the discharge end of said pipe may be swung reciprocably relatively toward and away from said inlet opening.

5. The combination of claim 3 and wherein the outer diameter of the discharge end is smaller than the interior diameter of the inlet opening; said discharge end movable from spaced position from said inlet opening into telescoped engagement therewith to substantially completely close the feed passage for bulk material into said inlet opening without restricting air flow from said pipe to said inlet opening.

6. The combination of claim 3 and wherein said discharge end of said pipe is bevelled downwardly and rearwardly in a direction away from said inlet opening.

7. In a pneumatic conveying system the combination comprising a horizontal supporting frame; a pressure vessel for containing bulk material to be conveyed; one end only of said vessel including an air pervious bottom closure adapted to be connected to an air pressure source and through which air can be introduced into said vessel; a conveyor conduit for conveying material from interiorly of said vesesl disposed with its inlet opening in said vessel above and adjacent to said pervious closure; and means including pivotal connecting means mounting said vessel to said frame for movement of said vessel from a substantially horizontal position to a vertically inclined position relative to said frame whereat said pervious end closure defines the lower-most regions of the vessel towards which the bulk material will gravitate.

8. The combination of claim 7 and wherein said vessel is mounted on a vehicle carrier; and wherein said means mounting said vessel comprises a tiltable dump structure carried on the chassis of said vehicle carrier.

9. The combination of claim 7 and wherein a feed-back pipe is mounted interiorly of said vessel with its discharge end disposed adjacent the inlet to said conveyor conduit in normally spaced axial air flow registry therewith, and with the intake end of said feed-back pipe disposed at the upper extremities of said vessel when the latter occupies its vertically inclined position.

10. The combination of claim 9 and wherein the discharge end of said feed-back pipe is mounted for reciprocable movement relatively toward and away from said inlet opening; and wherein feed-back pipe control means connected to the discharge end of said pipe and extending exteriorly of said vessel is provided to permit said pipe to be adjustably reciprocated relative to said inlet opening.

References Cited in the file of this patent

UNITED STATES PATENTS

| | | |
|---|---|---|
| 925,591 | Pangborn | June 22, 1909 |
| 2,027,697 | Nielsen | Jan. 14, 1936 |
| 2,565,835 | Adams | Aug. 28, 1951 |
| 2,675,274 | Engelhart | Apr. 13, 1954 |
| 2,734,782 | Galle | Feb. 14, 1956 |
| 2,842,406 | Standish | July 8, 1958 |

FOREIGN PATENTS

| | | |
|---|---|---|
| 1,057,523 | France | Oct. 28, 1953 |
| 751,162 | Great Britain | June 27, 1956 |